Figure 1:
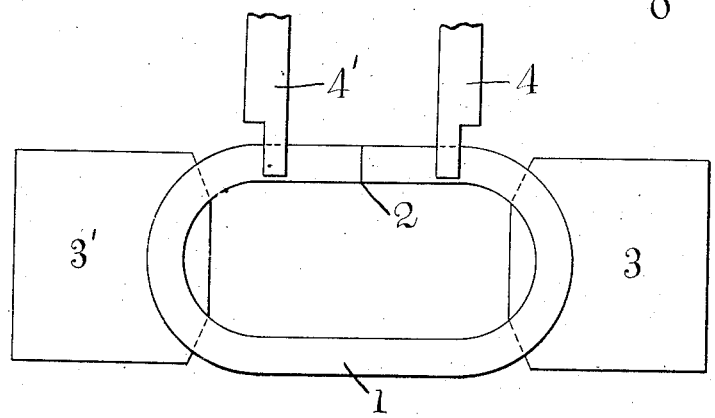

W. H. HODGES.
METHOD OF ELECTRICALLY WELDING CHAIN LINKS.
APPLICATION FILED JUNE 9, 1908.

1,072,614. Patented Sept. 9, 1913.

Witnesses:
Edward M. Jellinek
Irene Lefkowitz

Inventor
William H. Hodges.
By his Attorneys
Townsend & Dicken

UNITED STATES PATENT OFFICE.

WILLIAM H. HODGES, OF LYNN, MASSACHUSETTS, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

METHOD OF ELECTRICALLY WELDING CHAIN-LINKS.

1,072,614.  Specification of Letters Patent.  Patented Sept. 9, 1913.

Application filed June 9, 1908. Serial No. 437,594.

*To all whom it may concern:*

Be it known that I, WILLIAM H. HODGES, a citizen of the United States, and a resident of Lynn, in the county of Essex and State of Massachusetts, have invented certain new and useful Improvements in Methods of Electrically Welding Chain-Links, of which the following is a specification.

My invention relates to the manufacture of chain links and particularly to the method of welding the free ends of the link by means of an electric current of sufficient power to cause the metal of the link to reach a state of plasticity and become welded by pressure.

The object of my invention is to reinforce the welded portion of a chain link by forcing a large amount of metal into the weld and surrounding parts.

Heretofore it has been the practice in cases where the link has been closed by electrically welding the abutted ends together, to heat as short a portion of the metal of the link as possible and suddenly apply end pressure to make as quick a weld and with as little upset as possible. As little upset as possible has been especially desirable so as to facilitate the removal of the resulting bur by means of a press, hammer or other forging tool to obtain a link of uniform thickness of metal. After this bur is removed, it leaves the link weaker at the welded portion than it is at any other part which renders the strength of a chain formed of such links very uncertain so that for a high grade chain it is necessary to separately test each link which necessarily adds to the cost and makes it prohibitive in chains of the cheaper grade. Even if the bur obtained by this method of manufacture were not removed, it would not add any strength to the link as the bur is pointed and very ragged owing to the quickness at which the metal is upset and the small amount of metal in the weld.

By practising my invention the above disadvantages are overcome by slowly heating the metal and forcing a large amount of metal into the weld whereby a bunch of enlarged portion is formed about the weld and for a distance back from the weld in both directions and which is of smooth exterior and not necessary to remove.

To these ends my invention consists of slowly heating a large portion of the metal of the link and at the same time subjecting it to an endwise pressure in line with the axis of the weld whereby a large amount of metal is heated and forced into the weld, forming a bunch or enlargement which greatly strengthens the link, the endwise pressure being continued even after the welding of the two ends has been effected.

Figure 2:
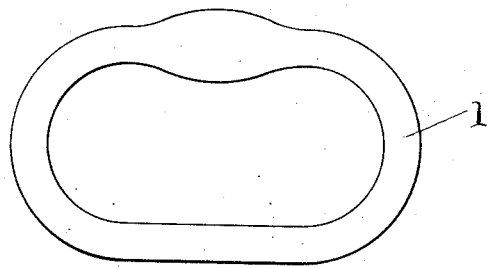
Figure 3:
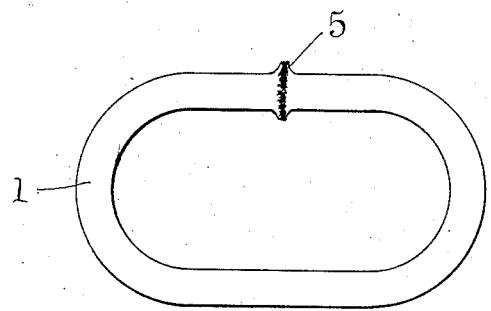

In the accompanying drawings, Figure 1 is a plan view of a chain link bent or formed in shape to be welded and located between pressure devices and current carrying electrodes. Fig. 2 is a plan view of the link after having its free ends welded together according to my invention. Fig. 3 is a plan view of a chain link welded according to previous methods and shows the same before the bur has been removed.

Referring to Fig. 1, 1 indicates a chain link suitably formed or forged to the desired shape and preferably from a single wire or bar of metal. The free ends of the link 1 are bent around until their ends meet and butt against each other as indicated by the line 2. The link so formed is placed between suitable holders forming pressure devices which grip the curved ends of the link and a heating current of electricity is passed through the abutting ends by means of current-carrying contacts which engage the work on either side of the abutting ends as is usual and well-known in the art. These work-holders and contacts form part of an electric welding machine of well known character and it is, therefore, deemed sufficient to merely diagrammatically indicate them. The work-holders are here typified as blocks of metal 3, 3', one or both of which are adapted to exert end pressure against the link in a line with the straight sides of the link by any suitable means.

4, 4' indicate contacts or electrodes which engage the section of work to be heated at either side of the abutted ends and are themselves each connected to one terminal of the secondary of a transformer adapted to supply current of sufficient volume to cause the metal between the contacts to become plastic as is usual in the art.

According to my invention the contacts 4, 4' are spaced considerable distance apart so that a longer length of metal of the link 1 between the contacts will become heated by the passage of the current from one contact to the other. The metal is heated slowly, in contradistinction to the quick heat given it in previous methods, by means of the current passing from the contact 4 to the contact 4' and at the same time the work-holders 3, 3' or only one work-holder presses up on the heated metal and slowly upsets the metal and owing to the large amount of metal heated and the slowness of the heat a considerable quantity of metal is thereby forced into the weld and the link between the contacts greatly increases in diameter. The current is kept on until the welding of the two ends is effected when the current is cut off, but the pressure devices 3, 3' still press up on the heated work so as to force more metal into the link back of the weld and continue the swelling of the metal. To keep the metal in a semi-plastic condition so that the metal surrounding the weld can be further upset, a current of less capacity might be supplied to the work instead of entirely cutting off the heating current after the weld has been effected. The finished link is illustrated in Fig. 2.

Obviously where a chain is desired the individual links will be threaded to each other before their ends are welded together.

Obviously the link might be formed of two U-shaped pieces butted end to end in which case there would be a similar swell on each side of the link.

Referring to Fig. 3, a chain is here illustrated as it appears after being welded according to previous methods and before subjecting it to the hammering or forging action to remove the bur. The bur, indicated at 5, is of a very rugged and split character consisting mostly of a number of sharp points owing to the sudden pressure and partial burning of the metal due to the quick heating to which it is subjected.

What I claim as my invention is:—

1. The herein described method of making chain links consisting in butting the free ends of the link together, passing an electric current through the abutted ends for the purpose of bringing them to a state of plasticity, delaying the heating to cause a considerable length of metal to become slowly heated, and adjusting the heating and pressure to produce a smooth and well-defined extended oval swelling around the joint, and force a great amount of metal into the welded area, as well as additional metal to be forced into the heated part of the link back of the weld, the said swelling being formed at the same time that the weld is made.

2. The herein described method of manufacturing chain links consisting in butting the free ends of the link together, passing a heating electric current through the abutted ends and contiguous metal to cause the ends to become plastic, and delaying the heating and applying a graduated endwise pressure at the same time to effect the weld, and continuing the heating at a lower degree as well as the pressure so that the metal will become softened back from the weld and form an extended and well-defined oval swelling of the metal, thus reinforcing the welded portion and the metal immediately back from the welded portion.

Signed at Lynn, in the county of Essex and State of Mass. this 28th day of May, A. D. 1908.

WILLIAM H. HODGES.

Witnesses:
ARTHUR L. USHER,
G. W. N. CHADWELL.